US007254491B2

(12) United States Patent
Mylaraswamy et al.

(10) Patent No.: US 7,254,491 B2
(45) Date of Patent: Aug. 7, 2007

(54) CLUSTERING SYSTEM AND METHOD FOR BLADE EROSION DETECTION

(75) Inventors: Dinkar Mylaraswamy, Fridley, MN (US); Emmanuel O. Nwadiogbu, Scottsdale, AZ (US); Mohamad Hanif Y. Vhora, Tempe, AZ (US)

(73) Assignee: Honeywell International, Inc., Morristown, NJ (US)

( * ) Notice: Subject to any disclaimer, the term of this patent is extended or adjusted under 35 U.S.C. 154(b) by 481 days.

(21) Appl. No.: 10/879,883

(22) Filed: Jun. 28, 2004

(65) Prior Publication Data

US 2005/0288901 A1 Dec. 29, 2005

(51) Int. Cl.
*G06F 19/00* (2006.01)

(52) U.S. Cl. ............................ 702/34; 702/33; 702/34; 702/179; 702/180; 702/181; 702/182; 702/183; 702/184; 702/185; 702/188; 702/196; 701/99; 73/119 R

(58) Field of Classification Search .................. 702/34, 702/57, 104, 179–185, 33, 188, 196; 701/99; 73/119 R
See application file for complete search history.

(56) References Cited

U.S. PATENT DOCUMENTS

| | | | |
|---|---|---|---|
| 5,081,830 A | 1/1992 | Schwarz et al. | |
| 5,235,801 A | 8/1993 | Evenson et al. | |
| 5,339,628 A | 8/1994 | Maus et al. | |
| 5,479,350 A | 12/1995 | Barakchi et al. | |
| 5,526,266 A | 6/1996 | Rutan et al. | |
| 5,726,891 A | 3/1998 | Sisson et al. | |
| 5,748,500 A | 5/1998 | Quentin et al. | |
| 6,408,259 B1 | 6/2002 | Goebel et al. | |
| 6,470,258 B1 | 10/2002 | Leamy et al. | |
| 6,550,464 B1 | 4/2003 | Brackney | |
| 6,574,537 B2 | 6/2003 | Kipersztok et al. | |
| 6,715,916 B2 | 4/2004 | Tomlinson et al. | |
| 2003/0139908 A1* | 7/2003 | Wegerich et al. | 702/183 |
| 2005/0021212 A1* | 1/2005 | Gayme et al. | 701/99 |

* cited by examiner

*Primary Examiner*—Hal Wachsman
*Assistant Examiner*—Phuong Huynh
(74) *Attorney, Agent, or Firm*—Ingrassia Fisher & Lorenz

(57) ABSTRACT

A system and method for detecting erosion in turbine engine blades is provided. The blade erosion detection system includes a sensor data processor and a cluster analysis mechanism. The sensor data processor receives engine sensor data, including exhaust gas temperature (EGT) data, and augments the sensor data to determine sensor data residual values and the rate of change of the sensor data residual values. The augmented sensor data is passed to the cluster analysis mechanism. The cluster analysis mechanism analyzes the augmented sensor data to determine the likelihood that compressor blade erosion has occurred. Specifically, the cluster analysis mechanism performs a 2-tuple cluster feature analysis using Gaussian density functions that provide approximations of normal and eroded blades in a turbine engine. The 2-tuple cluster feature analysis thus provides the probability that the sensor data indicates erosion has occurred in the turbine engine.

29 Claims, 7 Drawing Sheets

300

```
function  [L, S, M] = build_gdf (data)
% [L, S, M] = BUILD_GDF (data)
%
% Builds a Gaussian Density Function given measurement data.
%
% Inputs:
%   data ........ The original Nx2 measurement data matrix
%                 There are N data segments. Column 1 is the EGT residual
%                 and Column 2 is the EGT residual slope.
%
% Outputs:
%   L .......... 2x2 rotation matrix. L(:,1) is the rotation along the
%                EGT residual axis. L(:,2) is the rotation along the
%                EGT residual slope axis
%   S .......... Covariance matrix of the Gaussian Function. S is a 2x1
%                vector
%   M .......... Mean of the Gaussian Function. M is 2x1 vector
%
% Notes:
%   (a) Missing measurements MUST be specified as NaN.
%   (b) ~isnan(M) > 2, That is non-NaN samples should be greater
%       than sensors
%   (c) Will Fail if ~all(find( S )). That is, one of the standard
%       deviation is zero.
%   (d) If 'data' corresponds to GOOD engine, then you will get the
%       Gaussian function corresponding to good engine. That is Lg, Sg, Mg.
%       If the data corresponds to engine with eroded blades, than we get
%       the Gaussian Density function corresponding to bad engine. That
%       is Lb,Sb,Mb
%
%% remove any NaN that may have crept in because of missing measurement
x = isnan(data);
%% remove any nan's
nan_rows = find(sum(x')); %% contains atleadt one NAN
all_rows = [1:size(x, 1)];
non_nan_rows = setdiff(all_rows, nan_rows);
%
%% collect only non-nan rows
R = data(non_nan_rows, :);

%% The actual numnber of samples after removal of NaN
nSamp = size(R, 1);
%

% Auto scale to zero mean and unit variance
mean_R = mean(R); %[0 0 0];
std_R = std(R);

if ~all(find(S))
    error('Encountered one zero standard deviation');
end

norm_R = (R - repmat(mean_R, nSamp, 1))./repmat(std_R, nSamp, 1);
%
%% The covariance matrix for the data
A = (norm_R' * norm_R)/(nSamp - 1);

%% one line SVD to calculate the principal components
[U,S,V] = svd(A);
L = V;
S = diag(S);
M = mean_R;

return;
```

FIG. 5

500

```
function postProbability = erodedBladeProbability (xi, L, S, M, P0)
% postProbability = erodedBladeProbability (xi, M, S, L, P0)
%
% Calculates the posteriori probability of eroded blades given a 2-tuple
% measurement sample xi.
%
% Inputs:
%   xi ......... 2-tuple measurement vector. xi is a 2x1 column vector.
%                xi(1) is the EGT residual at the i'th sample. xi(2) is
%                the EGT residual slope at the i'th sample. It is assumed
%                that the engineering units of xi are consistent. That is
%                deg C and deg C/hour.
%
%  The next three input arguments define the Gaussian Density Function
%
%   L .......... 2x2 rotation matrix. L(:,1) is the rotation along the EGT
%                residual axis. L(:,2) is the rotation along the
%                EGT residual slope axis
%   S .......... Covariance matrix of the Gaussian Function. S is a 2x1
%                vector
%   M .......... Mean of the Gaussian Function. M is 2x1 vector. M(1) is
%                the center for EGT residual, M(2) is the center for the
%                EGT residual slope.
%   P0 ......... A priori probability for eroded blades. This is optional
%                argument. The default value is taken as 0.033
%
% Notes:
%   (a) Missing measurements MUST be specified as NaN.
%   (b) If the Gaussian function corresponding to good engine, That is
%       if you pass Lg, Sg, Mg then this function the probability that
%       the measurement sample belongs to a good engine.
%   (b) If the Gaussian function corresponding to bad engine, That is
%       if you pass Lb, Sb, Mb then this function the probability that
%       the measurement sample belongs to an engine with eroded blades.
%


if nargin < 5,
    %% Take the default value for P0
    P0 = 0.033;
end

%% denominiator of the Gaussian
EIG = inv(diag(S));
deno = 1/(2*pi*sqrt(det(EIG)));

%% The rotated vector
zi = L*(xi-M);

%% The Hotelling T2
Ti = zi'*EIG*zi;

%% Multivariate Gausian PDF calculation !\label{eqn:multi-gausian-pdf}
Prob_XgivenC = exp(-0.5*Ti) * deno;

%% Bayesian rule to calculate the posteriori probability
Prob_CgivenX = Prob_XgivenC * P0;

erodedBladeProbability = Prob_CgivenX;
```

FIG. 6

600

CLUSTERING SYSTEM AND METHOD FOR BLADE EROSION DETECTION

FIELD OF THE INVENTION

This invention generally relates to diagnostic systems, and more specifically relates to diagnostic systems for turbine engines.

BACKGROUND OF THE INVENTION

Modern mechanical systems can be exceedingly complex. The complexities of modern mechanical systems have led to increasing needs for automated prognosis and fault detection systems. These prognosis and fault detection systems are designed to monitor the mechanical system in an effort to predict the future performance of the system and detect potential faults. These systems are designed to detect these potential faults such that the potential faults can be addressed before the potential faults lead to failure in the mechanical system.

One type of mechanical system where prognosis and fault detection is of particular importance is aircraft systems. In aircraft systems, prognosis and fault detection can detect potential faults such that they can be addressed before they result in serious system failure and possible in-flight shutdowns, take-off aborts, delays or cancellations.

Modern aircraft are increasingly complex. The complexities of these aircraft have led to an increasing need for automated fault detection systems. These fault detection systems are designed to monitor the various systems of the aircraft in an effort to detect potential faults. These systems are designed to detect these potential faults such that the potential faults can be addressed before the potential faults lead to serious system failure and possible in-flight shutdowns, take-off aborts, delays or cancellations.

Turbine engines are a particularly critical part of many aircraft. Turbine engines are commonly used for main propulsion aircraft. Furthermore, turbine engines are commonly used in auxiliary power units (APUs) that are used to generate auxiliary power and compressed air for use in the aircraft. Given the critical nature of turbine engines in aircraft, the need for fault detection in turbine engines is of extreme importance.

Traditional fault detection systems for turbine engines have been limited in their ability to detect the occurrence of erosion in turbine blades. Erosion in compressor blades can result in serious blade damage, which can cause severe performance problems in the turbine engines. Unfortunately, previous fault detection methods have been unable to suitably detected erosion in the compressor blades with sufficient accuracy based on the limited data sets available for fault detection. Other fault detection methods have relied upon using devices such as borescopes for visual inspection of the turbine blades. These methods are also limited, as they typically require removal of the engine, thus resulting in excessive costs and vehicle downtime.

Thus, what is needed is an improved system and method for detecting erosion in turbine blades that can consistently detect erosion from engine faults from limited and sometimes noisy engine data sets.

BRIEF SUMMARY OF THE INVENTION

The present invention provides a system and method for detecting erosion in turbine engine blades. The blade erosion detection system includes a sensor data processor and a cluster analysis mechanism. The sensor data processor receives engine sensor data, including exhaust gas temperature (EGT) data, and augments the sensor data to determine sensor data residual values and the rate of change of the sensor data residual values. The augmented sensor data is passed to the cluster analysis mechanism. The cluster analysis mechanism analyzes the augmented sensor data to determine the likelihood that compressor blade erosion has occurred. Specifically, the cluster analysis mechanism performs a 2-tuple cluster feature analysis using Gaussian density functions that provide approximations of normal and eroded blades in a turbine engine. The 2-tuple cluster feature analysis thus provides the probability that the sensor data indicates erosion has occurred in the turbine engine. The output of the cluster analysis mechanism is passed to a diagnostic system where further evaluation of the determination can occur.

BRIEF DESCRIPTION OF DRAWINGS

The preferred exemplary embodiment of the present invention will hereinafter be described in conjunction with the appended drawings, where like designations denote like elements, and:

FIG. 5 is text view of an exemplary code portion that can be used to build Gaussian density functions;

FIG. 6 is a text view of an exemplary code portion that can be used to determine the probability of broken blades.

DETAILED DESCRIPTION OF THE INVENTION

The present invention provides a system and method for detecting erosion in turbine engine blades. The system and method uses a cluster analysis technique on engine sensor data to determine a probability of blade erosion in compressor blades.

Figure 1:
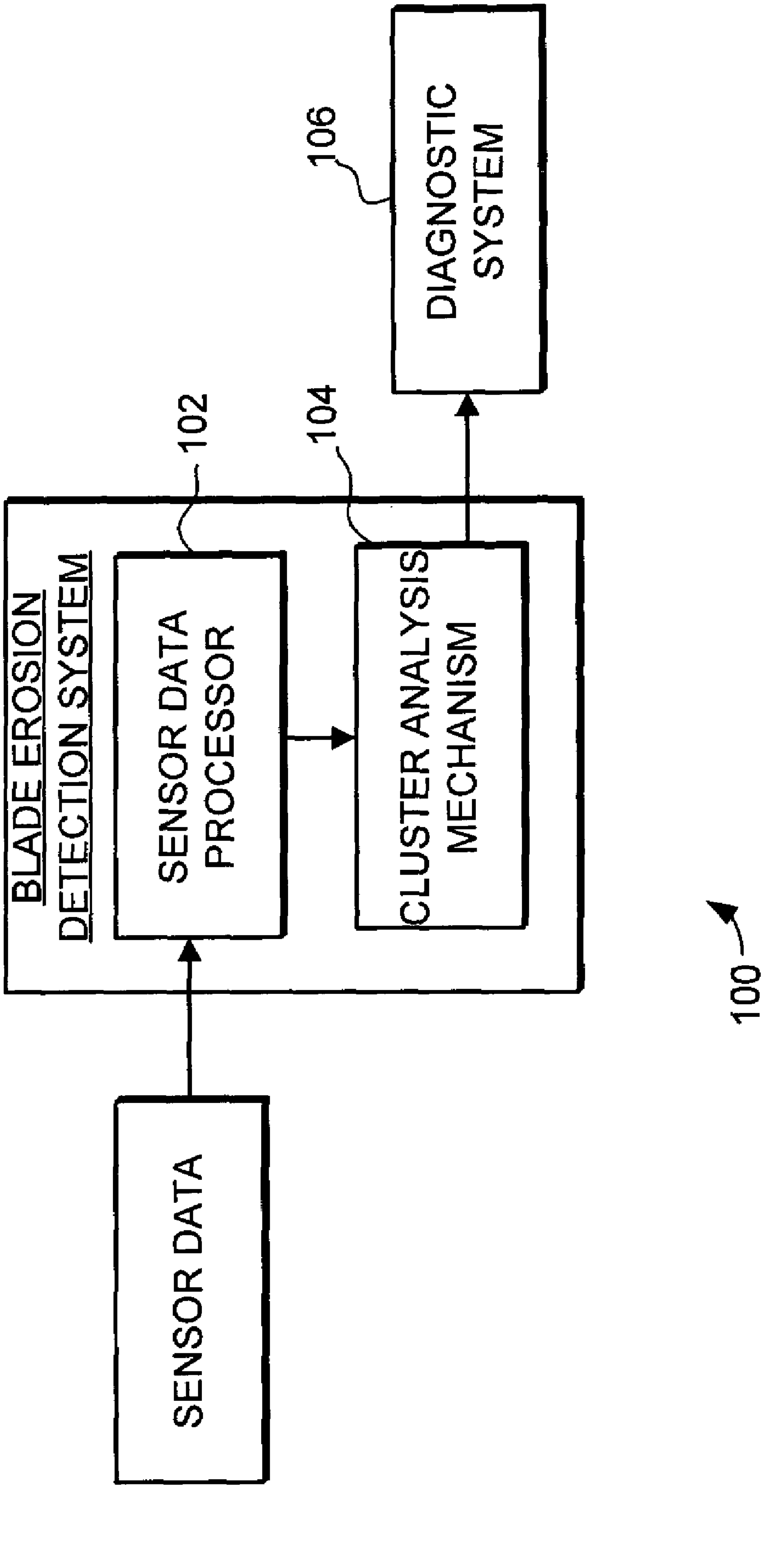
FIG. 1 is a schematic view of a blade erosion detection system.

Turning now to FIG. 1, an exemplary blade erosion detection system 100 is illustrated schematically. The blade erosion detection system 100 includes a sensor data processor 102 and a cluster analysis mechanism 104. The sensor data processor 102 receives engine sensor data, including exhaust gas temperature (EGT) data, and augments the sensor data to determine sensor data residual values and the rate of change of the sensor data residual values. The augmented sensor data is passed to the cluster analysis mechanism 104. The cluster analysis mechanism 104 analyzes the augmented sensor data to determine the likelihood that turbine blade erosion has occurred. Specifically, the cluster analysis mechanism 104 performs a 2-tuple cluster feature analysis using Gaussian density functions that provide approximations of normal and eroded blades in a turbine engine. The 2-tuple cluster feature analysis thus provides the probability that the sensor data indicates erosion has occurred in the turbine engine. The output of the cluster analysis mechanism 104 is passed to a diagnostic system 106 (such as a Bayesian Decision Making System) where further evaluation of the determination can occur.

Figure 2:
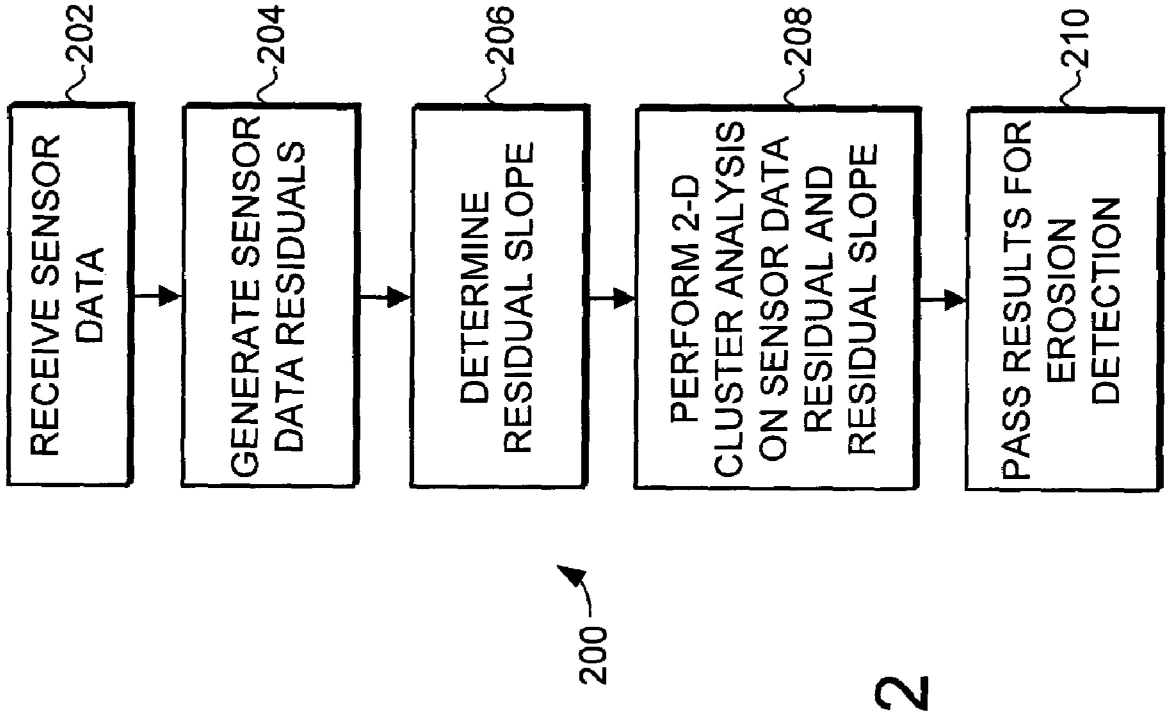
FIG. 2 is a flow diagram illustrating a blade erosion detection method.

Turning now to FIG. 2, a method 200 for compressor blade erosion detection is illustrated. Method 200 lists the general steps that can be performed in a blade erosion detection method using the embodiments of the present invention. The first step 202 is to receive sensor data from the turbine engine, with the sensor data providing the basis for the analysis and blade erosion detection. In one embodiment, the sensor data comprises exhaust gas temperature (EGT) data. However, other sensor data could be used, including other hot section temperature data.

The next step 204 is to generate residuals from the sensor data. In general, residuals comprise the difference between the measured value of the sensor data and an expected value of that same data, given the operating parameters of the engine. A variety of different techniques can be used to generate the expected sensor values and the corresponding residual values. It should also be noted that the residual difference could be a simple linear difference, or a more complex calculation of the differences between the actually observed values and the expected output values. Additionally, generating residuals can comprise additional processing for compensating for individual variations in the engines, such as the number of usage hours in the engine.

The next step 206 is to determine the rate of change in the residual, or stated another way, to determine the residual slope. In general, this step involves selecting a portion of the available sensor data and using a linear regression or other suitable technique to determine the slope of the residuals. For example, a least squares fit using a predetermined number of residual samples can be used to determine the residual slope at any given point in the data.

The next step 208 is to perform a 2-tuple (2-D) cluster analysis on the sensor data residual and the sensor data residual slope. In general, a tuple is an attribute that is necessary and sufficient to describe a physical system. In the method 200, 2-tuples are used to describe and analyze the system. Specifically, the system uses a 2-tuple system where two tuples are the magnitude and the rate of change of the sensor data from the turbine engine. The 2-tuple cluster analysis uses Gaussian density functions that provide approximations of normal and eroded blades in a turbine engine. The 2-tuple cluster analysis evaluates the sensor data residual and sensor data residual slope using the Gaussian density functions to determine the probability that the data indicates erosion has occurred in the turbine engine.

The next step 210 is to pass the results to a diagnostic system to fully interpret the results and pass the diagnostic information to the diagnostic system for output to the user of interest. For example, the results can be passed to a Bayesian Decision Making system that augments the detection probability using a prior distribution or other suitable knowledge regarding occurrences of compressor blade erosion.

The system and method can be used to detect erosion in turbine engines blades. The system and method is particularly applicable to detecting blade erosion in compressor section of the turbine engine, which typically results in subtle changes in the engine efficiency. Compressor blades are of particular importance for the overall efficiency of the turbine engine. Furthermore, the system and method can be used to detect erosion in other sections, such as in the turbine section of engine.

As stated above, in one embodiment the sensor data used in system 100 and method 200 includes exhaust gas temperature (EGT) sensor data. The system and method receive EGT sensor data and generate EGT residuals from the sensor data. The EGT residuals comprise a measurement indicating the difference between the measured EGT values and the expected EGT values given the operating parameters of the turbine engine. The expected values for the EGT sensor data can generated in a plurality of ways. For example, an engine model can be used that represents the expected relationship between EGT, ambient conditions, and loads imposed on the engine. This engine model can be either physics based or empirical in nature. From this engine model and the other measured sensor values, the expected values of the EGT can be calculated.

For example, a predictive model can be developed using a physics model of the system that is validated against experimental data. As another example, the predictive model can be developed with data-driven techniques such as neural networks. In this implementation, a neural network is configured and trained to output expected output values based on received sensor data. It should be noted that the expected output values generated by the model can comprise the expected values for the originally received sensor data values, a subset of the original sensor data values, or for different sensor values altogether, such as data derived from the originally received sensor data values as a result of mathematical signal processing.

As one specific application, a Component-Map based Model (CMEM) is used to generate expected values for the EGT sensor data that occurs during main engine start (MES). The CMEM takes into account changes in ambient pressure (P2), ambient temperature (T2), inlet guide vane (IGV) position and generator load average (GLA). From this data, the CMEM provides expected values for the EGT at the corresponding operational parameters of the engine. The EGT sensor data is thus recorded during main engine start, and used to generate EGT residuals by comparing the EGT sensor data to EGT expected values provided from the CMEM.

The CMEM model is based on the behavior of the turbine engine during main engine startup. Estimating EGT expected values using a CMEM model generally requires that the turbine engine be equipped with adequate and appropriate sensors. However, this is often not the case, specifically for smaller turbine engine, in which the sensors are optimized for control rather than health monitoring. In those cases, the sensor values could be approximated using data driven techniques or other methods can be used for generating the expected values.

During main engine startup, an auxiliary power unit provides compressed air to start the engines and typically runs at a constant speed. Since the APU engine shaft is not accelerating, power generated by the power section is equal to the power absorbed by the load compressor and the generated load. The torque generated by the power section is proportional to the fuel flow, which in turn affects the temperature of the exhaust gas. Unlike the power section, the load compressor torque is calculated by solving the flow and the energy equations. Using this relationship, a composite CMEM model can be used to generate the expected values based on fuel flow and the temperature rise across the compressor. Thus, the appropriate approximations are made in the CMEM model and used to calculate an expected value of EGT.

As one specific application, an empirical model is used to solve the momentum balance equations and hence calculate the torque generated by the power section, in the absence of fuel flow sensor. The load compressor torque is calculated by solving the flow and the energy equations using available sensor measurements. This composite CMEM model can be used to generate the expected values for the EGT.

With the expected values provided by the engine model, the sensor data residuals can be calculated by comparing the expected values to the actual measured sensor data. The calculation of the residuals can also involve corrections to the residuals due to individual engine variations. For example, the residuals can be corrected by applying an empirical degradation model that compensates for the usage hours of the engine. Specifically, the correction adjusts the residuals based on a model that corrects the expected EGT values based on the number of hours in the engine. Thus, the expected values generated by the model are adjusted to compensate for normal engine degradation due to usage.

Thus, in this embodiment the EGT sensor data residuals are calculated in a two step process that compares the sensor data to expected values generated from a CMEM model, and corrects the residuals to compensate for engine wear. Stated mathematically, the expected value $y_0$ can thus be expressed as:

$$y_0 = M_1(P2,\ T2, GLA, IGV) + M_2(AHRS) \quad (1.)$$

where $M_1$ comprises the composite CMEM and $M_2$ comprises empirical degradation due to usage, and where P2 comprises ambient pressure, T2 comprises ambient temperature, IGV comprises inlet guide vane position, GLA comprises generator load average, and AHRS comprises engine hours.

With the residual values calculated from the model, the slope or rate of change of the residuals can be calculated. The slope of the residuals is used as the second tuple in the 2-tuple analysis. This additional feature helps detect erosion by providing multivariate feature discrimination in the presence of sensor noise and sensor measurement error.

The slope of the sensor data residuals can be calculated in any suitable manner. Generally, it is not practical to calculate the derivative of the residual directly because of possible non-uniformity in the sampling rate of the sensor data. As such, one suitable method of calculating the slope is to use a linear fit method. The linear fit method calculates the linear fit of the last N samples of the filtered data, where N is typically selected based on empirical data. In general, it is desirable to minimize the number of points used to calculate the slopes because the number of points required to generate the slope values directly influences the number of points that it takes to get the first algorithm output. Thus, the number N is preferably chosen empirically based on a determination of the minimum number of points that can be used in the slope calculation to maintain good performance in the compressor blade erosion detection system. As one specific example, a linear fit of exhaust gas temperature residuals can be provided using a least squares technique over the past 50 samples.

Figure 3:
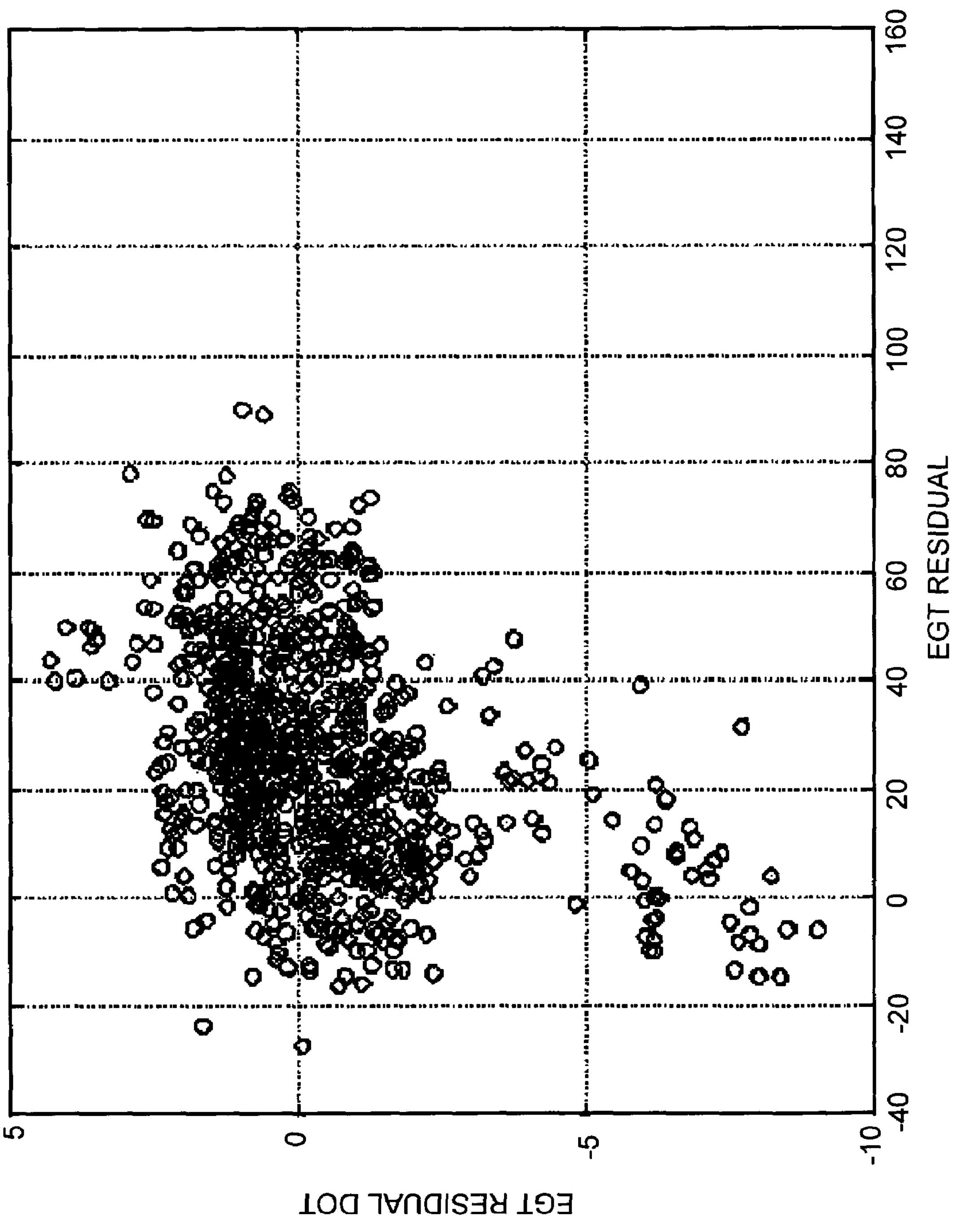
FIG. 3 is a graph illustrating exemplary EGT residual and EGT residual slopes.

Turning now to FIG. 3, a scatter plot 300 is illustrated that shows EGT residual and EGT residual slopes (labeled EGT residual dot) taken from 14 different turbine engines. In this data example, a rolling window of 50 samples was used to calculate the EGT residual slopes. As is illustrated in scatter plot 300, the sample data is grouped together into two distinct clusters, one cluster for normal engines with no reported blade erosion problems, and a different cluster for engines with broken blades. From this data it can be deduced that a compressor with eroded engine blades will have EGT residuals within normal bounds, but will also have a very high rate of negative change in the EGT residual slope. Furthermore, as can be seen in FIG. 3, the cluster for the good engines is not aligned with the cluster from the bad engines. In the embodiments of the invention, Gaussian density functions are used to approximate the clusters of data for good and bad engines. Because the original clusters are not aligned, the Gaussian density functions should be rotated to achieve a tight fit.

Specifically, the system and method use a 2-tuple (2-D) cluster analysis on the sensor data residual and the sensor data residual slope to determine blade erosion likelihood. The 2-tuple cluster analysis uses Gaussian density functions that provide approximations of normal and eroded blades in a turbine engine. The 2-tuple cluster analysis evaluates the sensor data residual and sensor data residual slope using the Gaussian density functions to determine the probability that the data indicates erosion has occurred in the turbine engine.

To facilitate this, Gaussian density functions are used that provide an approximation of the data clusters and a mechanism for discriminating between them. Specifically, one Gaussian density function is used that describes the cluster of data from good turbine engines, and one Gaussian density function is used that describes the cluster of data from turbine engines with blade erosion. In one embodiment, each the clusters is approximated using a 2-dimensional Gaussian density function that can be expressed as:

$$C_g = \{m_g, S_g, L_g\} \quad (2.)$$

$$C_b = \{m_b, S_b, L_b\} \quad (3.)$$

where $C_g$ is the Gaussian density function representing the cluster for normal "good" engines, and $C_b$ is the Gaussian density function representing the cluster for "bad" engines with blade erosion, and where $m_g$ and $m_b$ represent the centers of the Gaussian, $S_g$ and $S_b$ represent the diagonal covariance matrix. $L_b$ and $L_g$ are matrixes that provide for the rotation needed to tightly fit the original data clusters. The numerical values for the Gaussian distribution functions are best derived empirically using field data. As one example, the rotational vectors can be calculated using a singular value decomposition of a covariance matrix.

As one specific example, a set of historical data can be organized as a matrix $X_g$. In one implementation of the matrix $X_g$, the first column represents EGT residuals and the second column represents EGT residual slopes, and each row in matrix corresponds to one measurement sample. The values for $m_g$ can determined by calculating the column mean of the data matrix $X_g$. Likewise, a singular value decomposition can performed on the square matrix resulting from $X_g^T * X_g$ and used to define $S_g$. Finally, $L_g$ can be defined as the right unitary matrix resulting from the decomposition. A similar analysis can be performed for calculation of the $C_b$ cluster.

Figure 4:
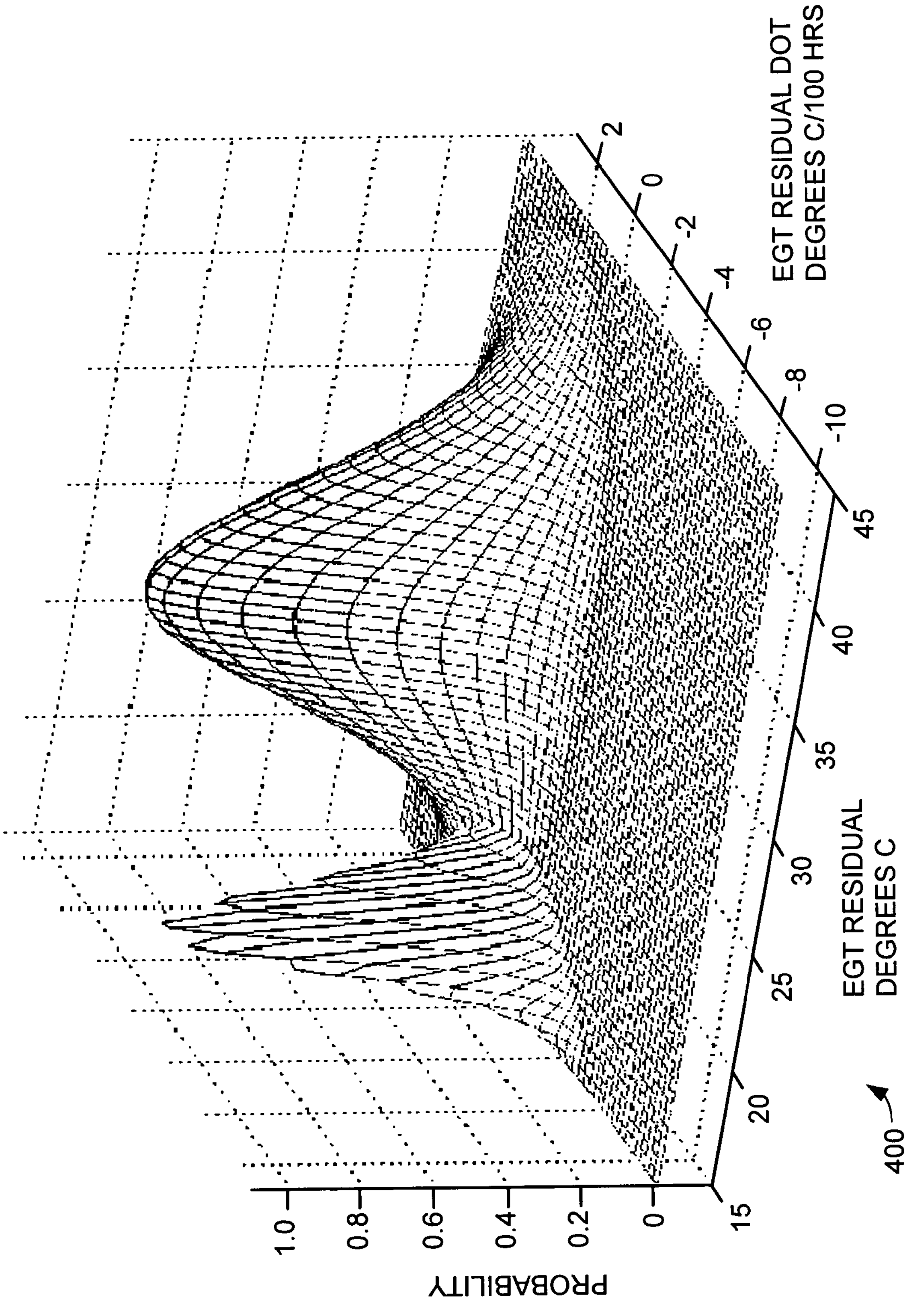
FIG. 4 is graph illustrating an exemplary pair of Gaussian density functions that approximate engine erosion clusters.

Turning now to FIG. 4, a three-dimensional plot 400 of an exemplary pair of Gaussian density functions that approximate engine erosion clusters is illustrated. Like its corresponding clusters, the Gaussian distribution functions are not aligned with each other. The Gaussian distribution functions illustrated in FIG. 4 can be used to determine if erosion has occurred in a turbine blade. Specifically, given a 2-tuple measurement $x_i$ where:

$$x_i \Leftrightarrow [r_i\ \Delta r_i]^T \quad (4.)$$

with $r_i$ represents the EGT residual and $\Delta r_i$ represents the EGT residual slope from the ith sample from any engine, the probability that this measurement belongs to the cluster $C_b$ (or $C_g$) is given by:

$$P(x_i \mid C_b) = \frac{1}{2\pi\sqrt{|S_b|}}\exp\left(-\frac{1}{2}T_i^2\right) \quad (5.)$$

where $$T_i^2=(x_i-m_b)^T L_b S_b^{-1} L_b^T (x_i-m_b) \quad (6.)$$

Having calculated $P(x_i|C_b)$, the probability that the measurement $x_i$ belongs to the cluster $C_i$, one can calculate the posteriori probability of broken blades given the ith sample from any equation can be calculated using Bayesian equation:

$$P(C_b|x_i)=P(x_i|C_b)*P(C_b) \quad (7.)$$

where $P(C_b)$ represents the a priori probability of broken blades taken from empirical data. In one example, evidence of broken blades was found in only 80 out of 2495 samples, and $P(C_b)$ for this case would be 0.033.

The technique illustrated in equations 4-7 can be implemented and solved using a variety of tools and methods. For example, it can be implemented using a MATLAB m-function. In this implementation, equations 4-7 are coded as a sequence of matrix operations. These functions can then be executed whenever a new sample $x_i$ is received by the sensor.

In one specific example, the system and method is implemented as a series of sub-routines that performed the necessary calculations. Included in these would be a sub-routine calculating the expected value of the EGT as per equation 1. In such an implementation, the model information $M_1$, $M_2$ are passed as input arguments to the sub-routine. The results from this sub-routine are then passed to a second sub-routine that performed the slope calculation. In this implementation, the necessary historical measurements to calculate the slope pf the residuals can be self-contained within this sub-routine.

The number of samples used in the calculation of the slope can be made configurable by the user to adjust the desired level of robustness. The clusters given by equation 2-3 are calculated using separate sub-routines. In one implementation, calculation of the clusters was part of an offline training phase using historical data. The necessary computation for this calculation is done using standard mathematical formulae.

The calculation of the singular values can be done using Matlab's statistics toolbox. In this implementation, output from the slope calculation (e.g, step 206) is passed to the 2-tuple analysis sub-routine that executed equations 5-6.

In one implementation, cluster information obtained from the separate training phase is passed as arguments to the 2-tuple analysis sub-routine. The diagnostic decision making (equation 7) can be done in a separate sub-routine. Furthermore, this sub-routine can be made configurable by the user to adjust the desired level of diagnostic performance with respect to false positives.

Turning now to FIG. 5, a code portion 500 illustrates an exemplary portion of MATLAB code that can be used to build the Gaussian density function. Specifically, the code portion 500 provides a function that uses a set of historical data from "good" and/or "bad" engines to create the corresponding Gaussian density functions by defining m, S, and L of equations 2 and 3. If used with data from "good" engines, the code portion 500 creates Gaussian density functions that represent good engines. Likewise, if used with data from "bad" engines the code portion 500 creates Gaussian density functions that represent bad engines, e.g., those with significantly eroded blades.

The code portion 500 includes code to remove any non-numerical data that is likely to indicate the presence of bad data. The code portion 500 then scales the cleaned data and checks for sufficient variability in the data to create the Gaussian density functions. The code portion 500 then normalizes the data and creates a covariance matrix, and calculates the singular values of the covariance matrix using the SVD function. From the singular values, the values for m, L and S are calculated, thus defining the Gaussian density function.

Turning now to FIG. 6, a code portion 600 illustrates an exemplary portion of MATLAB code that can be used to determine the probability of broken blades. Specifically, the code portion 600 defines a function erodedBladeProbability that implements equations 5, 6 and 7 as described above. The function receives five inputs and generates the probability that a sensor measurement comes from a turbine engine with an eroded blade. Specifically, the function receives a 2-tuple measurement vector $x_i$, the values for m, L and S that define the Gaussian density function, and a priori probability for eroded blades P0.

The function first determines if a priori probability was provided, and if it was not provided uses a default value of 0.033. The function then implements equations 5 and 6, to determine if the received measurement vector $x_i$ belongs to the cluster defined by the Gaussian density function. The function then uses the Bayesian rule to calculate the posteriori probability (as defined in equation 7) of eroded blades given the measurement vector. Specifically, by using the function erodedBladeProbability with Gaussian density functions from both good and bad engine clusters, the probability of the eroded blades in a turbine engine can be accurately determined.

Figure 7:
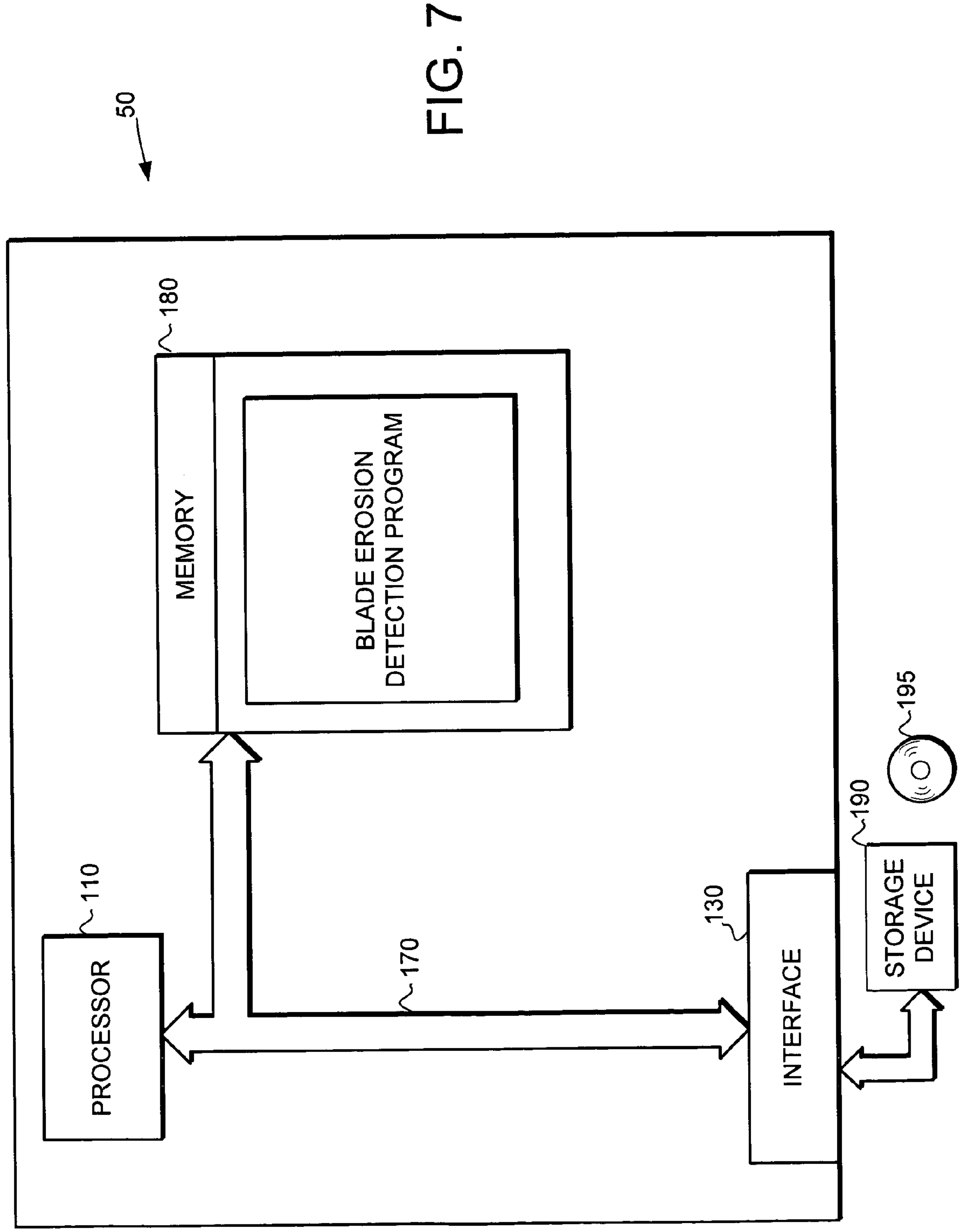
FIG. 7 is schematic view of an exemplary computer system implementing a blade erosion detection system.

The erosion detection system and method can be implemented in wide variety of platforms. Turning now to FIG. 7, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft to provide onboard diagnostics, or on the ground to provide remote diagnostics. The exemplary computer system 50 includes a processor 110, an interface 130, a storage device 190, a bus 170 and a memory 180. In accordance with the preferred embodiments of the invention, the memory system 50 includes a blade erosion detection program, which includes a sensor data processor and a cluster analysis mechanism.

The processor 110 performs the computation and control functions of the system 50. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based diagnostic computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as hard disk drives, flash systems, floppy disk drives and optical disk drives. As shown in FIG. 7, storage device 190 can comprise a disc drive device that uses discs 195 to store data.

In accordance with the preferred embodiments of the invention, the computer system 50 includes a blade erosion detection program. Specifically during operation, the blade erosion detection program is stored in memory 180 and executed by processor 110. When being executed by the processor 110, blade erosion detection program receives sensor data and determines the likelihood of blade erosion using a cluster analysis mechanism.

As one example implementation, the blade erosion detection system can operate on data that is acquired from the mechanical system (e.g., aircraft) and periodically uploaded to an internet website. The cluster analysis is performed by the web site and the results are returned back to the technician or other user. Thus, the system can be implemented as part of a web-based diagnostic and prognostic system.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

The present invention thus provides a system and method for detecting erosion in turbine engine blades. The compressor blade erosion detection system includes a sensor data processor and a cluster analysis mechanism. The sensor data processor receives engine sensor data, including exhaust gas temperature (EGT) data, and augments the sensor data to determine sensor data residual values and the rate of change of the sensor data residual values. The augmented sensor data is passed to the cluster analysis mechanism. The cluster analysis mechanism analyzes the augmented sensor data to determine the likelihood that blade erosion has occurred. Specifically, the cluster analysis mechanism performs a 2-tuple cluster feature analysis using Gaussian density functions that provide approximations of normal and eroded blades in a turbine engine. The 2-tuple cluster feature analysis thus provides the probability that the sensor data indicates erosion has occurred in the turbine engine. The output of the cluster analysis mechanism is passed to a diagnostic system where further evaluation of the determination can occur.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. An erosion detection system for detecting erosion in blades in a turbine engine, the erosion detection system comprising:

a sensor data processor, the sensor data processor adapted to receive engine sensor data from the turbine engine and generate sensor data residuals and sensor data residual slopes from the sensor data; and a cluster analysis mechanism, the cluster analysis mechanism adapted to perform a cluster analysis on the sensor data residuals and sensor data residual slopes using a first Gaussian density function representing a good turbine blade cluster and a second Gaussian density function representing an eroded turbine blade cluster to determine a likelihood that erosion has occurred in the blades.

2. The system of claim 1 wherein the blades comprise compressor blades.

3. The system of claim 1 wherein the sensor data processor is adapted to generate sensor data residuals by comparing the sensor data to expected sensor values provided from a turbine engine model.

4. The system of claim 1 wherein the sensor data processor is adapted to generate sensor data residual slopes by performing a linear trend fit on a set of sensor data residuals.

5. The system of claim 1 wherein the sensor data comprises exhaust gas temperature data.

6. The system of claim 1 wherein the cluster analysis mechanism is adapted to perform a cluster analysis using sensor data residuals and sensor data residual slopes by using the sensor data residuals and sensor data residual slopes as 2-tuples from non-eroded blades and 2-tuples from eroded blades that are approximated using the first Gaussian density function and the second Gaussian density function.

7. The system of claim 6 wherein the first Gaussian density function and the second Gaussian density function are determined during an offline training phase using historical data.

8. The system of claim 7 wherein the first Gaussian density function and the second Gaussian density function are rotated appropriately to fit the historical data.

9. The system of claim 1 wherein the cluster analysis mechanism calculates the likelihood that the sensor data corresponds to an engine with non-eroded blades and corresponds to an engine with eroded blades.

10. The system of claim 9 wherein the cluster analysis mechanism further uses a Bayesian rule to determine the probability of eroded blades in the turbine engine.

11. A method of detecting erosion in blades in a turbine engine, the method comprising the steps of:

a) receiving sensor data from the turbine engine;

b) generating sensor data residuals and sensor data residual slopes from the received sensor data; and c) determining a likelihood of erosion in the blades through a cluster analysis on the sensor data residuals and sensor data residual slopes by performing a cluster analysis on the sensor data residuals and sensor data residual slopes using a first Gaussian density function representing a good turbine blade cluster and a second Gaussian density function representing an eroded turbine blade cluster.

12. The method of claim 11 wherein the blades comprise compressor blades.

13. The method of claim 11 wherein the step of generating sensor data residuals comprises comparing the sensor data to expected sensor values provided from a turbine engine model.

14. The method of claim 11 wherein the step of generating sensor data residuals and sensor data residual slopes comprises generating sensor data residual slopes by performing a linear trend fit on a set of sensor data residuals.

15. The method of claim 11 wherein the sensor data comprises exhaust gas temperature data.

16. The method of claim 11 wherein the step of determining a likelihood of erosion in the turbine blades through a cluster analysis on the sensor data residuals and sensor data residual slopes comprises using the sensor data residuals and sensor data residual slopes as 2-tuples from non-eroded blades and 2-tuples from eroded blades that are approximated using the first Gaussian density function and the second Gaussian density function.

17. The method of claim 16 further comprising the step of determining the first Gaussian density function and the second Gaussian density function during an offline training phase using historical data.

18. The method of claim 17 wherein the first Gaussian density function and the second Gaussian density function are rotated appropriately to fit the historical data.

19. The method of claim 11 wherein the step of determining a likelihood of erosion in the turbine blades through a cluster analysis on the sensor data residuals and sensor data residual slopes comprises calculating a likelihood that the sensor data corresponds to an engine with non-eroded blades and corresponds to an engine with eroded blades.

20. The method of claim 19 wherein the step of calculating a likelihood that the sensor data corresponds to an engine with non-eroded blades and corresponds to an engine with eroded blades comprises using a Bayesian rule to determine the probability of eroded blades in the turbine engine.

21. A program product comprising:

a) an erosion detection program for detecting erosion in blades in a turbine engine, the erosion detection program including:

a sensor data processor, the sensor data processor adapted to receive engine sensor data from the turbine engine and generate sensor data residuals and sensor data residual slopes from the sensor data; and a cluster analysis mechanism, the cluster analysis mechanism adapted to perform a cluster analysis on the sensor data residuals and sensor data residual slopes using a first Gaussian density function representing a good turbine blade cluster and a second Gaussian density function representing an eroded turbine blade cluster to determine a likelihood that erosion has occurred in the blades; and b) computer-readable signal bearing media bearing said erosion detection program.

22. The program product of claim 21 wherein the wherein the blades comprise compressor blades.

23. The program product of claim 21 wherein the sensor data processor is adapted to generate sensor data residuals by comparing the sensor data to expected sensor values provided from a turbine engine model.

24. The program product of claim 21 wherein the sensor data processor is adapted to generate sensor data residual slopes by performing a linear trend fit on a set of sensor data residuals.

25. The program product of claim 21 wherein the sensor data comprises exhaust gas temperature data.

26. The program product of claim 21 wherein the first Gaussian density function and the second Gaussian density function are determined during an offline training phase using historical data.

27. The program product of claim 26 wherein the first Gaussian density function and the second Gaussian density function are rotated appropriately to fit the historical data.

28. The program product of claim 21 wherein the cluster analysis mechanism calculates the likelihood that the sensor data corresponds to an engine with non-eroded blades and corresponds to an engine with eroded blades.

29. The program product of claim 28 wherein the cluster analysis mechanism further uses a Bayesian rule to determine the probability of eroded blades in the turbine engine.

* * * * *